Sept. 30, 1969     R. C. BUELER     3,469,889

CONTROL VALVE

Filed Aug. 9, 1967

INVENTOR
RICHARD C. BUELER
BY
Joseph E. Papin.

United States Patent Office 3,469,889
Patented Sept. 30, 1969

3,469,889
CONTROL VALVE
Richard C. Bueler, Glendale, Mo., assignor to Wagner Electric Corporation, Newark, N.J., a corporation of Delaware
Filed Aug. 9, 1967, Ser. No. 659,378
Int. Cl. B60t *13/12*
U.S. Cl. 303—6                                    19 Claims

ABSTRACT OF THE DISCLOSURE

A control valve including an inhibiting portion for inhibiting the application through said control valve of a fluid pressure applied thereto, and a control portion responsive to a predetermined differential between the supplied fluid pressure and another fluid pressure separately supplied to said control valve to disable said inhibiting portion and thereby effect an uninhibited application of the first named supplied fluid pressure through said control valve.

---

Figure 2:
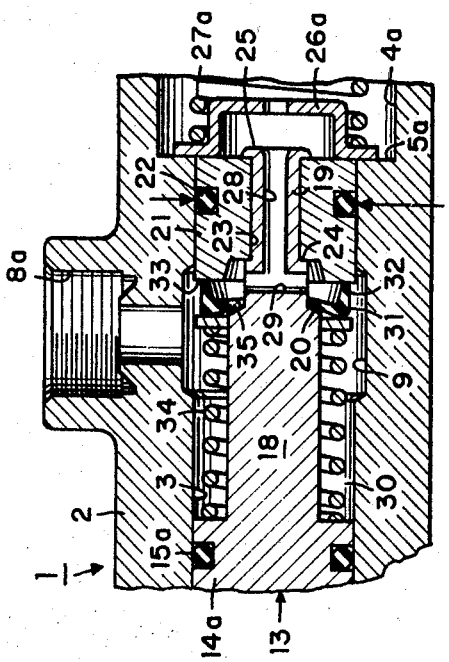

This invention relates in general to dual fluid pressure systems and in particular to control valves for controlling pressure fluid flow through one of said dual systems.

In the past, dual fluid pressure systems were provided with a control or driver warning valve which was responsive to a fluid pressure failure in one of the dual systems to light a driver warning or dash lamp and also with another control or inhibiting valve which inhibited the application of fluid pressure through one of the dual systems to one vehicle brake set wherein, for instance, said one vehicle brake set included disc type brakes and the other vehicle brake set included the usual shoe brake. One of the disadvantages or undesirable features of such past constructions was that the driver warning valves and inhibiting valves were separate units, which not only affected the cost of manufacturing but also the cost of assembly, both of the valves per se and on the vehicle, and the utilization of such separate valve units also presented a space factor problem since under-the-hood space in modern vehicles is becoming critical. Another of the disadvantageous or undesirable features of such past constructions was that the inhibiting valve continued to inhibit the application of the fluid pressure applied to one vehicle brake set even though a failure had occurred in the other portion of the dual system connected with the other vehicle brake set.

The primary object of the present invention is to provide a control valve which overcomes the aforementioned disadvantageous or undesirable features and this, as well as other objects and advantageous features of the present invention, will become apparent hereinafter.

Figure 1:
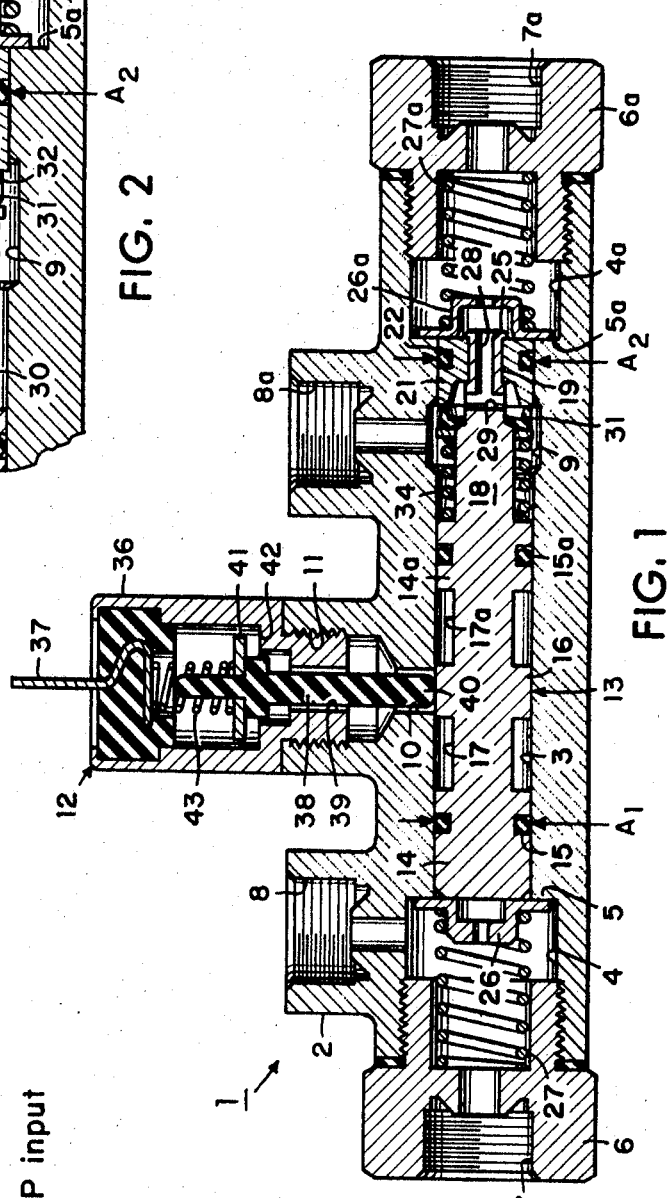
Figure 3:
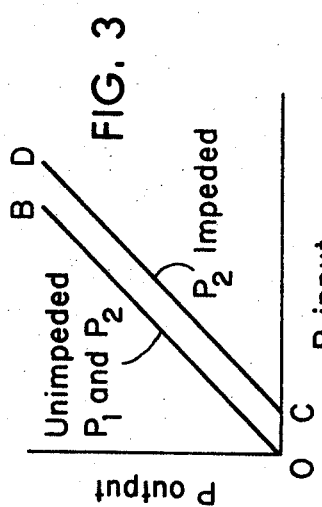

In the drawings wherein like numerals refer to like parts wherever they occur:

FIG. 1 is a sectional view showing a control valve embodying the present invention in cross-section, FIG. 2 is an enlarged fragmentary view showing a portion of the control valve of FIG. 1 in cross-section, and FIG. 3 is a graphical representation of the output pressure effected by the control valve of FIG. 1 in response to the input pressure supplied thereto.

Briefly, one aspect of the present invention comprises a control valve having means movable therein for comparing the magnitudes of separate fluid pressures supplied thereto including other means for inhibiting the application through said control valve of one of the supplied fluid pressures.

Referring now to FIGS. 1 and 2 in detail, a control or driver warning valve, indicated generally at 1, is provided with a housing 2 having a bore 3 axially interposed between opposed counterbores or fluid pressure receiving chambers 4, 4a, and opposed annular shoulders 5, 5a are defined on said housing at the juncture of said bore and counterbores. The counterbores 4, 4a are threaded at their outer or open ends to threadedly receive closure members or end plugs 6, 6a, and input ports 7, 7a are provided in said end plugs connecting with the counterbores 4, 4a, respectively, said input ports 7, 7a being adapted for respective connection with the separate fluid pressure generating chambers of a dual or split system type master cylinder (not shown) of a type well known to the art. Output ports 8, 8a are also provided in the housing 2 respectively intersecting with the counterbore 4 and with the bore 3 adjacent the rightward end thereof, and an annular undercut or recess 9 is provided in the rightward end of said bore at the intersection thereof with the output port 8a, said output ports 8, 8a being adapted for respective connection with rear and front vehicle brakes of the conventional shoe type and of the conventional disc or spot disc type (not shown) well known to the art. A cross-bore and cross-counterbore 10, 11 are also provided in the housing 2, said cross-bore intersecting the housing bore 3 adjacent the mid-portion thereof and said cross-bore being threaded at its open end to threadedly receive an electrical switch therein, indicated generally at 12 (to be discussed in detail hereinafter).

A reciprocal switch actuating member or piston, indicated generally at 13, is shown in its normal operating or centered position in the housing 2 having spaced opposed annular flanges 14, 14a with peripheral seals 15, 15a disposed therein slidably received in the housing bore 3 on opposite sides of the intersection of said bore with the cross-bore 10. The piston 13 is also provided with a switch positioning land 16 between the flanges 14, 14a thereof which is slidable in the housing bore 3 and positioned beneath the housing cross-bore 10 when said piston is in its centered or normal operating position (as shown), and peripheral switch locking grooves 17, 17a are provided in said piston on opposite sides of said land. The piston 13 is also provided with stepped extensions 18, 19 integrally connected with the rightward end of the piston flange 14a, and a peripheral beveled or inclined shoulder or seat 20 is defined between said stepped extensions. Another annular flange or piston 21 having a peripheral seal 22 disposed therein is slidably received in the housing bore 3 between the housing shoulder 5a and the undercut 9 and is provided with an axial bore 23 therethrough to receive the piston extension 19. The piston extension 19 is provided with another annular shoulder 24 adjacent its mid-portion for abutment or positioning engagement with the flange 21, and said flange is retained against displacement from said piston extension by suitable means, such as a swaged portion at 25. The sealing engagement of the seals 15, 22 with the housing bore 3 define opposed, substantially equal effective areas $A_1$, $A_2$ on the opposed ends of the piston 13 which are responsive to the magnitudes of separate fluid pressures supplied to the housing chambers 4, 4a, respectively, upon actuation of the split system type master cylinder. Spring retainers 26, 26a are biased toward engagement with the housing shoulders 5, 5a and the piston flanges 14, 21 in the housing chambers 4, 4a by precompressed movement impeding or centering springs 27, 27a having substantially equal and opposite forces for maintaining the piston 13 in its centered or normal position, as shown.

An axial passage and cross-passage 28, 29 are provided in the piston extension 19 connecting between the housing chamber 4a and an inhibiting chamber 30 defined in the housing bore 3 between the seals 15a, 22 of the piston flanges 14a, 21, said inhibiting chamber being in open pressure fluid communication with the housing undercut 9 and port 8a. An annular sealing member or valve element 31 is provided with an outer annular sealing lip 32 which is normally biased into sealing engagement with the leftward face or valve seat 33 provided in the piston flange 21 by the compressive force of a valve spring and retainer 34 interposed between the piston flange 14a and said valve element, and an annular inner sealing or bleeding lip 35 is also provided on said valve element in sealing engagement with seat 20 between the stepped extensions 18, 19. In this manner, the sealing engagement between the outer and inner lips 32, 35 with their respective seats 33, 20 normally interrupts or inhibits pressure fluid communication between the ports 7a, 8a. It should also be noted that the cross-sectional effective areas of the piston 13 defining the inhibiting chamber, i.e., between the seals 15a and 22, are self-cancelling.

The switch 12, as previously mentioned, includes a conductive closure or plug member 36 threadedly and conductively received in the housing cross-counterbore 11, and a metal terminal 37 extends through said plug member and is insulated therefrom, said terminal having an interior end for connection in an electrical circuit of a type well known in the art for selectively energizing a driver warning or dash lamp (not shown). A non-conductive switch member 38 is slidably received in a bore 39 provided in the plug member 36, said switch member having a lower end or follower portion 40 extending through the housing cross-bore 10 for engagement with the piston land 16 and having a conductive contact 41 on the upper end portion thereof for electrical engagement with another contact 42 on said plug member. To complete the description of the control valve 1, a current carrying spring 43 is interposed between the interior end of the terminal 37 and the switch member contact 41 urging it toward engagement with the contact 41 and urging the follower portion 40 of the switch member 38 into positioning engagement with the piston land 16.

In the operation with the component parts of the control valve 1 positioned as shown in the drawings and as described hereinabove, independent or separate fluid pressures $P_1$, $P_2$ normally having substantially equal magnitudes are supplied upon operator actuation of the split system type master cylinder (not shown) to the input ports 7, 7a, respectively, of said control valve. The supplied fluid pressure $P_1$ flows from the input port 7 into the housing chamber 4 and therefrom to the output port 8 to the rear conventional type shoe brakes (not shown), and this application is illustrated in the graphical representation in FIG. 3 along the line OB wherein the input and output magnitudes of the supplied fluid pressure $P_1$ at the input and output ports 7 and 8 are substantially equal. The supplied fluid pressure $P_1$ acts on the effective area $A_1$ of the piston 13 creating a force $P_1A_1$, and the supplied fluid pressure $P_2$ flows from the input port 8a into the housing chamber 4a acting on the effective area $A_2$ of said piston to create another force $P_2A_2$ which is substantially equal and opposite to the force $P_1A_1$. Since the supplied fluid pressures $P_1$, $P_2$ were previously defined as being substantially equal and since the areas $A_1$, $A_2$ were previously described as being opposed and substantially equal, it is, of course, obvious that the forces $P_1A_1$, $P_2A_2$ are substantially self-cancelling; therefore, the piston 13 is unaffected by the supplied fluid pressures $P_1$, $P_2$ so long as their magnitudes are substantially equal and will remain in its normal or centered position, as shown. The supplied fluid pressure $P_2$ also flows through the piston passage and cross-passage 28, 29 into the chamber 30 acting on the rightward or input force or effective area of the seal 31, and when the magnitude of the supplied fluid pressure $P_2$ acting on the effective area of the seal attains a predetermined value to establish an input force $Fi$ to overcome the pre-compressive force of the spring 34, said seal is moved leftwardly against said spring to disengage the outer lip 32 thereof from the flange seat 33 to meter or apply pressure fluid through the chamber 30 to the output port 8a and establish an output fluid pressure $P_{2o}$ to the front conventional disc type brakes (not shown). It should be noted that this application is illustrated in the graphical representation in FIG. 3 along the line OC wherein the point C represents the predetermined value of the supplied or input fluid pressure $P_2$ at which the seal 31 is disengaged from the piston seat 33, and the line CD represents the subsequent output fluid pressure $P_{2o}$ attained at the output port 8a in response to further increases in the supplied fluid pressure $P_2$ at the input port 7a. The outfluid pressure $P_{2o}$ so established at the output port 8a acts on the leftward or output face or effective area of the seal 31 creating an output force $Fo$ additive to the force of the spring 34 and opposed to the force $Fi$, and when the output fluid pressure $P_{2o}$ is increassd to a value wherein the output force $Fo$ and the force of the spring 34 are substantially equal to or balance the opposing force $Fi$, the seal 31 is moved rightwardly to re-engage the seal outer lip 32 with the piston seat 33 and interrupt pressure fluid communication between the ports 7a, 8a. Of course, it is obvious from the foregoing that the compressive force of the spring 34 acting on the seal 31 delays or impedes the application of the fluid pressure $P_2$ from the input port 7a to the output port 8a which delays the energization of the front disc type brake connected therewith until the magnitude of the supplied fluid pressure $P_1$ attains a value great enough for effecting energization of the rear shoe type brakes, and it is also apparent from the foregoing that the differential between the magnitudes of the supplied or input fluid pressure $P_2$ at said input port and the output or established fluid pressure $P_{2o}$ at said output port is directly proportional to the compressive force of the spring 34.

When the desired vehicle deceleration is attained and the operator de-actuates the split master cylinder to again vent the system to atmosphere, the displaced fluid pressure $P_1$ returns from the output port 8 through the housing chamber 4 to the input port 7 and therefrom to the atmospheric reservoir of said split master cylinder thereby de-energizing the rear shoe type brakes. When the housing chamber 4a is so vented to the atmosphere, the force $Fi$ is eliminated, and the displaced output fluid pressure $P_{2o}$ returns from the output port 8a into the chamber 30; therefore, since the force $Fi$ is eliminated, the force $Fo$ tends to seat the seal outer lip 32 in engagement with the flange seat 33, and the output fluid pressure $P_{2o}$ acts on the inner lip 35 of said seal to effect disengagement thereof from the extension seat 20. Upon the disengagement of the seal inner lip 35 from the extension seat 20, pressure fluid communication is again established between the output port 8a and the vented input port 7a to eliminate the force $Fo$ wherein the output fluid pressure $P_{2o}$ returns from the chamber 30 through the extension passage and cross-passage 28, 29, the housing chamber 4a and the input port 7a to the atmospheric reservoir of the split system master cylinder thereby de-energizing the front disc type brakes. In this manner, the return flow of the displaced fluid pressures $P_1$, $P_2$ to the split master cylinder effects substantially simultaneous de-energization of both the front and rear brakes.

In the event that a sustained differential is established between the separately supplied fluid pressures $P_1$, $P_2$ due to a malfunction of the split master cylinder, leaks or the like, wherein the magnitude of the supplied fluid pressure $P_2$ exceeds that of the supplied fluid pressure $P_1$ by a predetermined value, the force $P_2A_2$ acting on the piston 13 will, of course, overcome that of the reduced force $P_1A_1$ acting thereon and displaces said piston against the retainer and return spring 26, 27 from its centered position leftwardly toward its leftward translated or disabled position since the reduction of the supplied fluid pressure $P_1$ effects a corresponding decrease in the force $P_1A_1$. This translatory leftward movement of the piston 13 moves the flange 14 thereof into displacement limiting or abutting engagement with the interior end of the closure member 6 with the spring retainer 26 interposed therebetween. Of course, the failure of the supplied fluid pressure $P_1$ obviates effective energization of the rear brakes; therefore, it is imperative that the front brakes be fully energized without delaying or impeding the function thereof. To this end, the leftward translatory movement of the piston 13 to its leftward disabled position concertedly moves the seal 22 of the flange 21 leftwardly toward a position disengaged from the housing bore 3 into the housing undercut or recess 9 creating a by-pass passage for the supplied fluid pressure $P_2$ directly from the input port 7a to the output port 8a through the housing chamber 4a and housing bore 3 from which the flange seal 22 is disengaged into the recess 9 and output port 8a. In this manner, the leftward translatory movement of the piston 13 into its disabled position disengages the flange seal 22 from sealing engagement between the input and output ports 7a, 8a and from the housing bore 3 establishing a by-pass passage for the supplied fluid pressure $P_2$ directly to said output port 8a obviating the impeding function of the impeding valve or seal 31 and thereby effecting an unimpeded energization of the vehicle front disc type brakes. As shown in the graphical representation in FIG. 3, this by-passed or unimpeded application of the supplied fluid pressure $P_2$ is along the line OB wherein the magnitudes of the supplied fluid pressure $P_2$ at the input and output ports 7a, 8a are substantially equal.

The leftward displacement movement of the piston 13 into its leftward translated or disabled position also moves the peripheral or cam surface of the land 16 thereof leftwardly toward a position disengaging said cam surface from the follower end 40 of the switch operating member 38 and placing the locking groove 17a beneath the housing cross-bore 10. The force of the switch spring 43 thereafter drives the operating member 38 radially or downwardly moving the follower end 40 thereof into the housing bore 3 and into locking engagement with the side wall of the locking groove 17a in order to prevent the return of the piston 13 to its centered position in response to the force of the spring 27 acting thereon, and the downward movement of said operating member also engages the contact 41 thereon with the switch contact 42 thereby energizing the switch 12 to complete its electrical circuit and light a dash lamp (not shown) for warning the vehicle operator that a portion of his brake system has failed. When the defect in the brake system has been repaired, the switch 12 may be manually removed or threadedly disengaged from the housing cross-counterbore 11 to remove the operating member follower end 40 from locking engagement with the piston groove 17a, and the compressive force of the return spring 27 will return the piston 13 to its centered position, as shown, with the seal 22 again in sealing engagement with the housing bore 3 between the input and output ports 7a, 8a closing the by-pass passage, wherein said switch may then be manually replaced in its original position.

In the event that an oppositely directed differential is established between the supplied fluid pressures $P_1$, $P_2$ due to a malfunction of the split master cylinder, leaks or the like, wherein the magnitude of the supplied fluid pressure $P_1$ exceeds that of the supplied fluid pressure $P_2$ by a predetermined value, the force $P_2A_2$ will, of course, overcome the opposing force $P_1A_1$ acting on the piston 13 to move said piston toward its rightward displaced or translated position since the reduced supplied fluid pressure $P_2$ effects a correspondingly reduced force $P_2A_2$. The rightward translatory movement of the piston 13 against the compressive force of the return spring 27a engages or moves the piston flange 21 into displacement limiting or abutting engagement with the interior end of the closure member 6a with the spring retainer 26a interposed therebetween. In the rightward displaced position of the piston 13, the switch 12 will function, as described hereinbefore, to lockingly engage the operating member follower end 40 with the locking groove 17 and engage the contacts 41, 42 to complete the circuit and light the dash lamp.

From the foregoing, it is now apparent that a novel control valve 1 meeting the objects and advantageous features set forth hereinbefore, as well as others, is provided and that changes as to the precise configurations, shapes and details of the construction set forth in the disclosure by way of illustration may be made by those skilled in the art without departing from the spirit of the invention.

The embodiments of the invention in which an exclusive property or privilege is claimed are defined as follows:

1. A control valve comprising a housing, means movable in said housing toward opposed translated positions in response to a predetermined differential between the magnitudes of separate fluid pressures supplied thereto, said means defining with said housing a pressure fluid flow passage and by-pass passage means therethrough for one of the supplied fluid pressures, and other means controlling said flow passage and movable in response to the one supplied fluid pressure in excess of a predetermined value toward a position in said flow passage effecting pressure fluid flow therethrough to establish an applied fluid pressure having a magnitude in a predetermined ratio with that of the one supplied fluid pressure in excess of the predetermined value, said first named means being movable when the magnitude of the one supplied fluid pressure exceeds that of the other supplied fluid pressure by the predetermined differential toward one of its opposed translated positions to effect the application of the one supplied fluid pressure through said by-pass passage means and by-passing said flow passage.

2. The control valve according to claim 1, wherein said other means comprises resiliently urged means normally urged toward a position in said flow passage interrupting pressure fluid flow therethrough, said resiliently urged means being movable in response to the one supplied fluid pressure in excess of the predetermined value toward a position in said flow passage effecting the pressure fluid flow therethrough to establish the applied fluid pressure in the predetermined ratio with the one supplied fluid pressure in excess of the predetermined value.

3. The control valve according to claim 1, wherein said other means includes valve means, and resilient means urging said valve means toward a position in said flow passage interrupting pressure fluid flow therethrough, said valve means being movable against said resilient means in response to the one supplied fluid pressure in excess of the predetermined value acting thereon toward an open position in said flow passage to effect the application of the one supplied fluid pressure therethrough and establish the applied fluid pressure, the applied fluid pressure acting on said valve means and assisted by the force of said resilient means to urge said valve means toward its flow passage interrupting position when the magnitude of the applied fluid pressure attains a value in the predetermined ratio with that of the one supplied fluid pressure in excess of the predetermined value.

4. The control valve according to claim 3, comprising a valve seat on said first named means in circumscribing relation with said flow passage, said resilient means normally urging said valve means into engagement with said valve seat to interrupt pressure fluid flow through said flow passage.

5. The control valve according to claim 1, wherein said flow passage includes a pair of chambers in said housing, said first named means being movable between said chambers, and a connecting passage in said first named means between said chambers.

6. The control valve according to claim 5, wherein said by-pass passage means comprises a bore in said housing between said chambers, said first named means including a portion normally disposed in said bore and movable therefrom to provide open pressure fluid communication therethrough between said chambers upon movement of said first named means to its one translated position.

7. The control valve according to claim 5, comprising a valve seat on said first named means between said chambers, said other means including valve means for engagement with said valve seat to close said connecting passage, resilient means urging said valve means toward engagement with said valve seat, said valve means being movable against said resilient means in response to the one supplied fluid pressure in excess of the predetermined value acting thereon toward a position disengaged from said valve seat to open said connecting passage and establish the applied fluid pressure, and the applied fluid pressure acting on said valve means and assisted by the force of said resilient means to urge said valve means toward its position in engagement with said valve seat when the magnitude of the applied fluid pressure is increased to a value in the predetermined ratio with that of the one supplied fluid pressure in excess of the predetermined value.

8. The control valve according to claim 7, comprising a stepped portion on said first named means in one of said chambers defining another valve seat therebetween, said valve means including a portion for engagement with said other valve seat, the return flow of the applied fluid pressure from said one chamber through said connecting passage to the other of said chambers acting on said valve means to effect the engagement thereof with said first named valve seat and to disengage said valve means portion from said other valve seat.

9. A control valve comprising a housing having a pair of fluid pressure chambers therein, switch actuating means movable in said housing and defining therewith a third chamber between said pair of chambers, passage means in said switch actuating means and connected between one of said pair of chambers and said third chamber, valve means normally urged toward a position closing said passage means and interrupting pressure fluid communication between said one of said pair of chambers and said third chamber, said valve means being movable in response to the established fluid pressure in excess of a predetermined value in said one of said pair of chambers toward a position effecting the application thereof through said passage means into said third chamber, opposed portions on said switch actuating means respectively subjected to the established fluid pressures in said pair of chambers, one of said opposed portions defining with said housing other passage means between said one of said pair of chambers and said third chamber in by-pass relation with said first named passage means, said switch actuating means being responsive to the established fluid pressure in said one of said pair of chambers acting on said one opposed portion and having a magnitude predeterminately in excess of that of the established fluid pressure in the other of said pair of chambers acting on the other of said opposed portions to move said one opposed portion toward a position in said housing establishing by-pass pressure fluid communication between said pair of chambers through said other passage means.

10. A control valve comprising a housing, first means for comparing the magnitudes of separate fluid pressures supplied thereto and movable in said housing between a normal position and opposed translated positions in response to a predetermined differential between the magnitudes of the supplied fluid pressures respectively acting thereon, said first means including second means defining with said housing passage means therethrough for one of the supplied fluid pressures, and third means defining with said housing other passage means for the one supplied fluid pressure in by-pass relation with said first named passage means, and fourth means movable on said first means for controlling said first named passage means, said fourth means being movable in response to the one supplied fluid pressure in excess of a predetermined value acting thereon toward a position in said first named passage means effecting the flow of said one supplied fluid pressure therethrough to establish an applied fluid pressure having a magnitude less than and in a predetermined ratio with that of the one supplied fluid pressure in excess of the predetermined value when said first means is in its normal position, and said first means being movable toward one of its opposed translated positions when the magnitude of the one supplied fluid pressure exceeds that of the other of the supplied fluid pressure by the predetermined differential to open said other passage means and effect the application of the one supplied fluid pressure through said other passage means by-passing said first named passage means and obviating actuation of said fourth means.

11. A control valve comprising a housing having a pair of ports therein, means movable in said housing between said ports including valve means controlling pressure fluid communication between said ports, said valve means being movable in response to fluid pressure at one of said ports in excess of a predetermined value acting thereon toward a position effecting pressure fluid communication between said ports to establish fluid pressure at the other of said ports having a magnitude in a predetermined ratio with that of the fluid pressure at said one port in excess of the predetermined value, a third port in said housing, opposed areas on said first named means respectively subjected to fluid pressure at said one and third ports, and said first named means also including other means for controlling pressure fluid communication between said one and other ports, said first named means being responsive to the fluid pressure at said one port acting on one of said areas in the event the magnitude thereof attains a value predeterminately greater than that of the fluid pressure at said third port acting on the other of said areas to move said other means toward a translated position establishing open pressure fluid communication between said one and other ports and obviating actuation of said valve means.

12. The control valve according to claim 11, comprising an effective area on said valve means subjected to the fluid pressure at said one port, resilient means normally urging said valve means toward a position interrupting pressure fluid communication between said one and other ports, said valve means being movable against said resilient means toward its pressure fluid communication effecting position in response to the force of the fluid pressure at said one port in excess of the predetermined value acting on said valve means area, and another effective area on said valve means opposed to said first named valve means area and subjected to the established fluid pressure at said other port, said valve means being urged against said force toward its pressure fluid communication interrupting position in response to the established fluid pressure at said other port acting on said valve means other area and assisted by the compressive force of said resilient means when the magnitude of the established fluid pressure at said other port is increased to a value in the predetermined ratio with that of the fluid pressure at said one port in excess of the predetermined value.

13. The control valve according to claim 11, comprising passage means in said first named means between said one and other ports, resilient means normally urging said valve means toward a position closing said passage means and interrupting pressure fluid communication between said one and other ports, the fluid pressure at said one port in excess of the predetermined value acting on said valve means to move said valve means against said resilient means toward another position opening said passage means to establish pressure fluid communication between said one and other ports, the established fluid pressure at said other port acting on said valve means and assisted by the force of said resilient means to urge said valve means toward its position closing said passage means when the magnitude of the established fluid pressure at said other port is increased to a value in the predetermined ratio with that of the fluid pressure at said one port in excess of the predetermined value.

14. The control valve according to claim 11, comprising passage means in said housing between said one and other ports, said other means normally closing said passage means and being movable with said first named means toward the translated position thereof opening said passage means to establish the open pressure fluid communication therethrough between said one and other ports.

15. The control valve according to claim 11, comprising first and second passage means in said first named means and in said housing between said one and other ports, respectively, resilient means normally urging said valve means toward a position closing said first passage means, said other means being normally disposed in said second passage means to close pressure fluid communication therethrough between said one and other ports, the fluid pressure in excess of the predetermined value at said one port acting on said valve means to move said valve means against said resilient means and open said first passage means to establish fluid pressure at said other port when said second passage is closed, the established fluid pressure at said other port acting on said valve means and assisted by the force of said resilient means to urge said valve means against the force of the fluid pressure at said one port acting thereon toward its position closing said first passage means when the magnitude of the established fluid pressure at said other port is increased to a value in the predetermined ratio with that of the fluid pressure at said one port in excess of the predetermined value, and said other means being movable to its translated position to open said second passage means and establish the open pressure fluid communication therethrough between said one and other ports and by-passing said first passage means upon the actuation of said first named means in response to the predetermined difference between the fluid pressures at said one and third ports.

16. The control valve according to claim 15, wherein said first named means comprises piston means movable in said housing, flange means on said piston means defining said other means slidable in said second passage means, said first passage means being in said piston and extending through said flange means in circumscribing relation with said first passage means, said resilient means being biased between said piston means and valve means normally urging said valve means into engagement with said valve seat to close said first passage means, and said valve means being movable against said resilient means from engagement with said valve seat to open said first passage means in response to the fluid pressure in excess of the predetermined value at said one port acting thereon.

17. The control valve according to claim 16, comprising another annular valve seat on said piston means and opposed to said first named valve seat, said valve means including an annular sealing member disposed on said piston means and having radially outer and inner annular sealing portions respectively engaged with said first named and other valve seats, said inner sealing portion being disengaged from said other valve seat in response to return flow of pressure fluid from said other port through said first passage means to said one port.

18. A control valve comprising a housing, a bore in said housing, a pair of spaced ports in said housing connected with said bore, recess means in said bore between said ports, a third port in said housing connected with said recess means, piston means, first flange means on said piston means slidable in said bore between said recess means and one of said ports, second flange means on said piston means slidable in said bore between said recess means and the other of said ports, a connecting passage in said piston means extending through said second flange means between said other and third ports, a valve seat on said second flange means in circumscribing relation with said connecting passage and facing said third port, valve means on said piston means for engagement with said valve seat to close said connecting passage, spring means on said piston means normally urging said valve means into engagement with said valve seat, said valve means being movable in response to fluid pressure at said other port in excess of a predetermined value acting thereon from engagement with said valve seat against said spring means to open said connecting passage and establish pressure fluid communication between said other and third ports, the established fluid pressure at said third port also acting on said valve means in a direction additive to said spring means to effect the re-engagement of said valve means with said valve seat wherein the magnitude of the established fluid pressure is predeterminately less than that at said other port, and opposed effective areas on said first and second flange means subjected to the fluid pressures at said one and other ports, respectively, said piston means being movable toward said one port when the magnitude of the fluid pressure at said other port exceeds that at said one port by a predetermined value to move said second flange means out of sliding engagement with said bore and toward said recess means to establish direct pressure fluid communication through said bore and recess means between said other and third ports by-passing said connecting passage and obviating actuation of said valve means.

19. The control valve according to claim 7, wherein said by-pass passage means includes a bore in said housing between said chambers, said first named means being normally disposed in said bore to obviate pressure fluid flow therethrough between said chambers, and said bore being opened to by-pass said connecting passage and effect by-pass pressure fluid flow through said bore between said chambers upon the movement of said first named means toward its one translated position.

References Cited
UNITED STATES PATENTS

| 2,145,114 | 1/1939 | Gibbs et al. | 137—100 X |
| 2,650,863 | 9/1953 | Fore | 303—84 |
| 3,191,614 | 6/1965 | Feibush | 137—118 |
| 3,369,090 | 2/1968 | Turchan. | |

MILTON BUCHLER, Primary Examiner

JOHN J. McLAUGHLIN, Jr., Assistant Examiner

U.S. Cl. X.R.

60—54.5; 137—87; 188—151, 152; 200—82; 303—84